United States Patent [19]

Rosenberg

[11] Patent Number: 4,729,794
[45] Date of Patent: Mar. 8, 1988

[54] SKI WAX COMPOSITION AND PROCESS OF APPLICATION

[75] Inventor: Ira Rosenberg, Norwalk, Conn.

[73] Assignee: Edge Line Products, Inc., Trumbull, Conn.

[21] Appl. No.: 741,944

[22] Filed: Jun. 6, 1985

[51] Int. Cl.⁴ .................. C08L 1/08; C08L 91/06; C08K 5/24
[52] U.S. Cl. .................. 106/191; 106/270; 106/271; 524/265; 524/277
[58] Field of Search .................. 106/270, 271, 272; 524/277, 265

[56] References Cited

U.S. PATENT DOCUMENTS

| | | | |
|---|---|---|---|
| 4,126,481 | 11/1978 | Sampson et al. | 106/191 |
| 4,144,325 | 3/1979 | Voyt | 424/59 |
| 4,202,879 | 5/1980 | Shelton | 424/66 |
| 4,321,295 | 3/1982 | Smith-Johannsen | 428/403 |
| 4,343,863 | 8/1982 | Lawrence et al. | 106/270 |
| 4,379,136 | 4/1983 | Mochida | 424/63 |

OTHER PUBLICATIONS

Chem. Abst., vol. 71:14,411 m, Falandysz et al., 25 Sep. 68.

Primary Examiner—Theodore Morris
Attorney, Agent, or Firm—Grimes & Battersby

[57] ABSTRACT

A wax composition for waxing skis comprising a wax matrix having incorporated therein a silicone polymer of relatively low volatility.

7 Claims, No Drawings

SKI WAX COMPOSITION AND PROCESS OF APPLICATION

BACKGROUND OF THE INVENTION

This invention relates to wax compositions suitable for waxing skis and to a method for applying such compositions to skis. More particularly, it relates to compositions and processes of this character whereby a wax layer may be applied to the base of the ski without having to heat the wax composition.

The waxing of skis is an art that has been practiced since the sport was discovered. It has been known that a coat of wax on the base of wooden skis allowed the skis to glide smoother and thus faster. Even with the use of newer plastic materials in the construction of skis, the art of waxing is still practiced. In these conventional procedures mixtures of hard and soft paraffin based materials are mixed hot and either dripped or brushed onto the bottom of the ski base. The efficacy of the paraffin's mixture depends on the type of snow, the temperature of the snow and air, and the moisture content of the snow. Most systems for waxing skis are usually complicated and cumbersome to use and understand.

Several patents relating to ski waxing compositions are known in the prior art. None of these, however, are suggestive of the present invention as will be described in more detail below.

U.S. Pat. No. 2,494,431 to Dissel et al teaches a ski lacquer which comprises a mixture of a resin, particularly nitrocellulose in solution, a wax and a salt or an ester of a sulfo-succinic acid. The latter are said to act as plasticizers or blending agents for the wax.

U.S. Pat. No. 4,343,863 to Lawrence et al also relates to a ski waxing composition which is said to reduce "ski drag". The invention of this patent is described as residing in the incorporation of a poly(alphaolefin) in a wax formulation.

U.S. Pat. No. 4,126,481 to Sampson discloses a solid wax lubricant for skis said to be effective in drag reduction. This composition comprises a combination of a rigid wax matrix of a thermoplastic water-soluble polymer disposed in the wax matrix. Among the thermoplastic polymers suggested for use by the patentee are polyacylamides, carboxymethyl cellulose, sodium carboxymethyl cellulose, polysaccharide, guar gum, vinyl pyridine, poly(ethylene oxide) and mixtures thereof.

U.S. Pat. No. 3,785,841 to Beard teaches a wax composition containing paraffin wax and ethyl cellulose or oleyl amide resin. This is described as being moisture repellant, having low adhesion to snow and as being particularly suitable on snow shovels.

SUMMARY OF THE INVENTION

It has now been found that a wax layer can be placed on the base of a ski without having to heat the wax if there is incorporated in the wax mixture certain silicone polymers of relatively low volatility. Although the volatility of the silicone polymers that are useful herein is low, nevertheless this volatility may vary over a range.

DESCRIPTION OF THE INVENTION

The silicone polymers that can be employed in this invention may be any of a number of such polymers that are known in the prior art. The most useful polymers as indicated are those polymers that are of relatively low volatility and low molecular weight. Generally, these will have a molecular weight of the order of from about 100 to about 2,000. These will have a vapor pressure at 20° C. of from about 1.5 to about 500 mm. of Hg.

One class of volatile polysiloxanes that have been found to be particularly useful are the volatile methyl silicones. These are generally low molecular weight polymers of dimethyl siloxane having a molecular weight in the range of from about 100 to about 2,000 and a vapor pressure at 20° C. in the range of from about 1.5 to 100 mm. of Hg. Polymers of this type are available from a number of manufacturers. One such manufacturer is the SWS Silicone Corporation which provides the following materials:

1. Cyclomethacone (C.T.F.A. name, SWS 03314 SWS name) having the properties of low surface tension which enhances spreadability and wetting.

2. Cyclomethacone (same as number 1 but with lesser volatility; SWS name F-222).

3. Hexamethyldisiloxane (C.T.F.A. name; SWS name F-221), a low molecular weight silicone with a high degree of volatility.

The volatile silicone polymers employed in this invention are employed for a number of purposes. They serve to control both the consistency of the base (to allow for even smooth application of the wax polymer mixture, and to leave enough film at the ski base/snow interface to allow for improved glide). They also serve to solubilize the waxes (e.g. paraffin waxes) and can be used in all proportions with mineral spirits and other solvents to provide a suitable vehicle for application to skis.

The quantity of volatile silicone polymer that may be incorporated in the present composition may vary somewhat. Generally, however, the volatile silicone polymer will constitute from about 5% to about 30% by weight based on the total weight of the composition.

A second component of the present composition is the wax. This may vary from a soft wax to a hard wax which will vary with the kind of snow on which the skis are intended to be used. Generally, softer waxes are used on soft snow and harder waxes are used on colder, harder snow. The wax component may comprise a single wax or a combination of waxes. This will depend on how the particular product is intended to be used.

A number of waxes known in the prior art may be used in the wax component of this invention. These include mineral waxes, synthetic waxes and naturally occurring waxes. By way of illustration, the following may be mentioned: paraffin wax, microcrystalline paraffin wax, beeswax, carnuba, etc. or mixtures thereof. Among the preferred waxes are the microcrystalline paraffin wax and beeswax.

The quantity of wax component that will be contained in the composition of the present invention may also vary somewhat. Generally, it will comprise from about 40% to about 80% by weight based on the total weight of the composition. In the preferred forms of this invention, this will constitute from about 55% to about 65% on the same weight basis.

A third component of the composition with which we are concerned is the solvent component which may comprise a single solvent of a combination of solvents. It is selected so that the wax and volatile silicone polymer compound may be solubilized or dispersed therein. Many such solvents are available and the following are given by way of illustration: mineral spirits, ethanol, isopropyl alcohol, benzene, naphthalene and toluene.

The quantity of solvent component employed will be related to the quantity of the other components that are incorporated in this composition. Usually, this will constitute between about 5% to about 30% by weight based on the total weight of the composition, with the preferred range being from about 10% to about 20% on the same weight basis.

In addition to components mentioned, a number of other optional polymeric additives may be included in the present invention. These include such things as VYBAR (Frank B. Ross Co.), polyethylene, polyacrylamide, carboxy methyl cellulose, sodium carboxy methyl cellulose, vinyl pyridine, poly(ethylene oxide) and mixtures thereof.

In preparing the compositions of this invention, a wax or a blend of waxes is melted with stirring on a hot plate until liquid. The heat is removed and the solvent and silicone is added. The mixture is stirred until uniform and then poured into a stick mold. The resulting product is a wax stick which is soft enough to be applied to skis and when buffed will set to a smooth finish. The surface of the wax is altered and the ability of a ski to glide on snow is greatly improved.

The products of this invention have been tested under field conditions. This has been accomplished by hours of skiing on a variety of snow conditions by four experienced skiers. Preception is such that the waxed ski appears to be gliding over the surface better than the unwaxed ski.

In using the composition this invention, the wax composition which is in solid form at ambient temperatures is first placed on the bottom surface of the ski in sufficient quantity to thoroughly coat this surface. The wax is then buffed with the traditional cork or with the use of a suitable cloth for buffing onto the surface and allowed to set for a period of minutes to one hour or more. The wax layer that is left on the ski appears to be more hydrophillic and allows for better glide of the ski on the snow surface.

The following Examples are given to further illustrate this invention. It is understood, however, that the invention is not limited thereto.

Using the procedure described above the following compositions were prepared:

EXAMPLE 1

| | |
|---|---|
| High grade paraffin wax | 65.00% |
| Cyclomethacone *(SWS Silicone F-222) | 15.00% |
| Mineral spirits | 20.00% |
| | 100.00% |

EXAMPLE 2

| | |
|---|---|
| Beeswax | 30.00% |
| Microcrystalline paraffin wax | 30.00% |
| *Cyclomethacone (SWS Silicone F-222) | 20.00% |
| Mineral spirits | 20.00% |
| | 100.00% |

*conforms to the formula

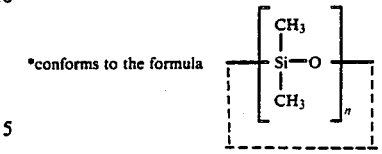

wherein n averages between 3-and 6.

What is claimed is:

1. A solid composition useful for waxing the base of skis to improve their performance, comprising:
   (a) a wax component in an amount between about 40% and about 80% by weight of the total composition;
   (b) a solvent component in an amount between about 5% and about 30% by weight of the total composition; and,
   (c) a polymer of a siloxane selected from the group consisting of dimethyl siloxane and cyclo siloxane and having a molecular weight between about 100 and about 2,000 and a vapor pressure at 20° C. between about 1.5 and about 100 mm of Hg, said polymer comprising between about 5% and about 30% by weight of the total composition.

2. A composition according to claim 1 wherein said wax component comprises from about 55% to about 65% based on the total weight of said composition.

3. A composition according to claim 1 wherein said solvent component comprises from about 10% to about 20% by weight based on the total weight of said composition.

4. A composition according to claim 1 further including a polymeric additive selected from the group consisting of polyethylene, polyacrylamide, carboxy methyl cellulose, sodium carboxy methyl cellulose, vinyl pyridine, and polyethylene oxide.

5. A composition according to claim 1 wherein said polymer of dimethyl siloxane is selected from the group consisting of cyclomethacone and hexamethyldisiloxane.

6. A composition according to claim 1 wherein said solvent component is selected from the group consisting of mineral spirits, benzene, toluene, ethanol, naphthalene, isopropyl alcohol and mixtures thereof.

7. A composition according to claim 1 wherein the wax component comprises a waxselected from the group consisting of paraffin wax, microcrystalline paraffin wax, beeswax, carnuba wax and mixtures thereof.

* * * * *